United States Patent [19]
Costa et al.

[11] Patent Number: 5,721,672
[45] Date of Patent: Feb. 24, 1998

[54] CORE MODULES FOR A LIFE SAFETY SYSTEM AND STRUCTURE FOR SUPPORTING SUCH MODULES IN A PANEL HOUSING

[75] Inventors: Hilario S. Costa, Sarasota; Kenneth W. Patterson, Bradenton, both of Fla.

[73] Assignee: General Signal Corporation, Stamford, Conn.

[21] Appl. No.: 644,815

[22] Filed: May 10, 1996

[51] Int. Cl.[6] .............................. H05K 7/14; H02B 1/056
[52] U.S. Cl. .......................... 361/801; 361/633; 361/733
[58] Field of Search ............................ 174/68.2, 72 B,
174/71 B, 88 B, 70 B, 99 B; 340/825.44;
361/627, 633, 637, 730, 732, 733, 736,
747, 775, 788, 796, 797, 801, 802, 807,
809, 810, 825, 829; 439/44, 50, 51, 54,
61, 65, 76.1, 114, 43

[56] References Cited

U.S. PATENT DOCUMENTS

| 3,560,799 | 2/1971 | Bochicchio | 361/775 |
|---|---|---|---|
| 4,288,838 | 9/1981 | Van Der Vegte et al. | 361/796 |
| 4,454,566 | 6/1984 | Coyne | 361/796 |
| 4,477,862 | 10/1984 | Gonzales | 361/803 |
| 4,533,793 | 8/1985 | Geppert | 361/788 |
| 5,006,961 | 4/1991 | Monico | 361/788 |
| 5,218,518 | 6/1993 | Deinhardt et al. | 361/747 |

*Primary Examiner*—Donald Sparks
*Attorney, Agent, or Firm*—Ohlandt, Greeley, Ruggiero & Perle

[57] ABSTRACT

A panel sub-system for a life safety system having a plurality of inter-connected panels, each panel including a local rail, and a plurality of modules, each comprising a module circuit board, inter-connected by the local rail. The first of the modules have a central processing unit, and the remainder I/O modules having a variety of functions, as well as at least two channel members containing respective rail circuit boards defining each local rail. Moreover, each board has spaced electrical connectors for connecting to the respective module circuit boards.

18 Claims, 14 Drawing Sheets

CORE MODULES FOR A LIFE SAFETY SYSTEM AND STRUCTURE FOR SUPPORTING SUCH MODULES IN A PANEL HOUSING

RELATED APPLICATIONS

The invention of this application is related to inventions described in five other applications with reference to the same life safety network that are owned by the assignee of the present invention:

U.S. patent application Ser. No. 08/644,479 filed on May 10, 1996 entitled, Life Safety System Having A Panel Network With Message Priority; U.S. patent application Ser. No. 08/644,834 filed on May 10, 1996 U.S. patent application Ser. No. 08/644,835 filed on May 10, 1996 U.S. patent application Ser. No. 08/644,816 filed on May 10, 1996 entitled, Automatic Addressing In Life Safety System; U.S. patent application Ser. No. 08/644,478 filed on May 10, 1996.

BACKGROUND OF THE INVENTION

This invention relates to a life safety system (e.g. fire alarm system), specifically to core modules in a particular panel housing of a multiple panel life safety system. Still, more specifically, the invention relates to a unique structure for supporting and electrically connecting such core modules in the panel housing.

The above-noted core modules are located at a central station to which reports come in from a variety of zones and stations with respect to alarm and trouble conditions and the like. The present invention constitutes one feature of a unique life safety system (e.g., fire alarm system). Other inventive features of that system can be appreciated by reference to the above-identified related applications, all of which have been assigned to the assignee of the present invention. The details of the construction and operation of the features described in thee above noted related applications are incorporated herein by reference.

With more comprehensive and versatile life safety systems having important new features which the above applications disclose, the complexity of the circuitry necessarily grows. Such circuitry for compactness is necessarily in the form of printed circuit boards. Some of these boards are part of zone modules which incorporate address switches and indicators which must be visible and accessible in the front of a panel arrangement or housing; other boards are rail-defining, i.e., they have printed conductors or buses, which constitute the means for power transmission and communication throughout the panel sub-system.

There is a need for a system to support such modules in a sturdy way—able to withstand the operation of the touch buttons under frantic circumstances. Such system must be versatile so that components can be readily changed around and replaced. Further, such a system must integrate the structural with the electrical so that as a circuit board or module is inserted into the panel housing, it is also electrically connected. The assembly of such a system should not require tools. The present invention is directed to these needs.

A further object of the invention is to provide in such a system novel means for latching closed the door associated with the modules.

A further object of the invention is to have a simplified arrangement for flexible connectability of module circuit boards and circuit boards which serve switch and indicator functions.

A further object of the invention is the provision of mounting means for the module doors, including standoff means to space the doors from the module circuit boards.

A still further object of the invention is to provide a complete connector scheme for both electrically connecting together the circuit boards for the modules and the rails, and for physically connecting both types of circuit boards so as to secure the sub-system.

SUMMARY OF THE INVENTION

In accordance with the present invention there is a panel sub-system for a life safety system having a plurality of inter-connected panels, each panel including a local rail, which includes a plurality of circuit modules, each having a module circuit board, interconnected by a local rail. The first of the modules are a central processing unit, and the remainder are I/O modules which have a variety of functions. There are two channel members which contain respective rail circuit boards that define every local rail, and these rail circuit boards have spaced electrical connectors that connect to the respective module circuit boards.

A specific feature of the invention may be summarized as a support system for a plurality of circuit modules in a panel arrangement, including the afore-noted module circuit boards and rail circuit boards. The system comprises a pair of parallel outwardly facing parallel support channels adapted to be supported in the housing. The flanges of each channel have grooves on both the inner and outer sides, the grooves on the inner sides confronting each other. Rail circuit boards are received between the inner grooves of the flanges of each support channel. Each of the rail circuit boards has forwardly facing spaced electrical connector blocks.

There is also a pair of apertured module retainers receiving respectively aligned connector blocks on the rail board, each retainer comprising an apertured stabilizing plate resting against the flanges of the channels respectively, the plates having unitary rearward arms with fingers which slide into the outer grooves in the flanges. The arms further have extensions adapted to engage the back of the panel housing box to space the channel therefrom and constitute rearward stabilizing means. The plates are each formed with a socket for receiving the attaching stud as the module is secured thereto.

Other and further objects, advantages and features of the present invention will be understood by reference to the following specification in conjunction with the annexed drawings, wherein like parts have been given like numbers.

BRIEF DESCRIPTION OF THE DRAWINGS

Further objects and features of the invention will be apparent from a review of the following specification including the drawings, all of which disclose non-limiting embodiments of the invention. In the drawings.

DESCRIPTION OF THE PREFERRED EMBODIMENTS

Figure 1:
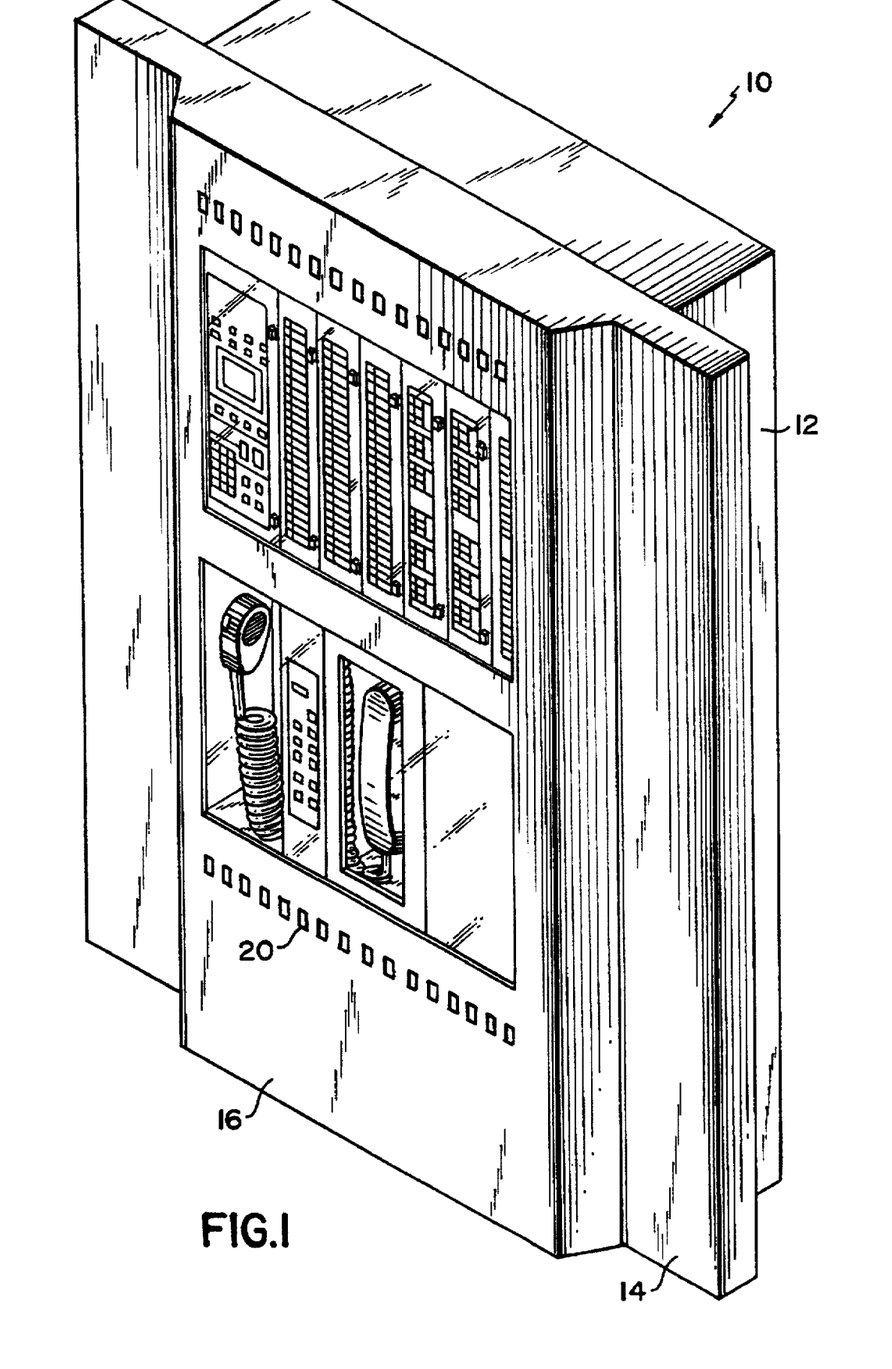
FIG. 1 is a perspective of a panel arrangement embodying the invention shown completely assembled.
Figure 2:
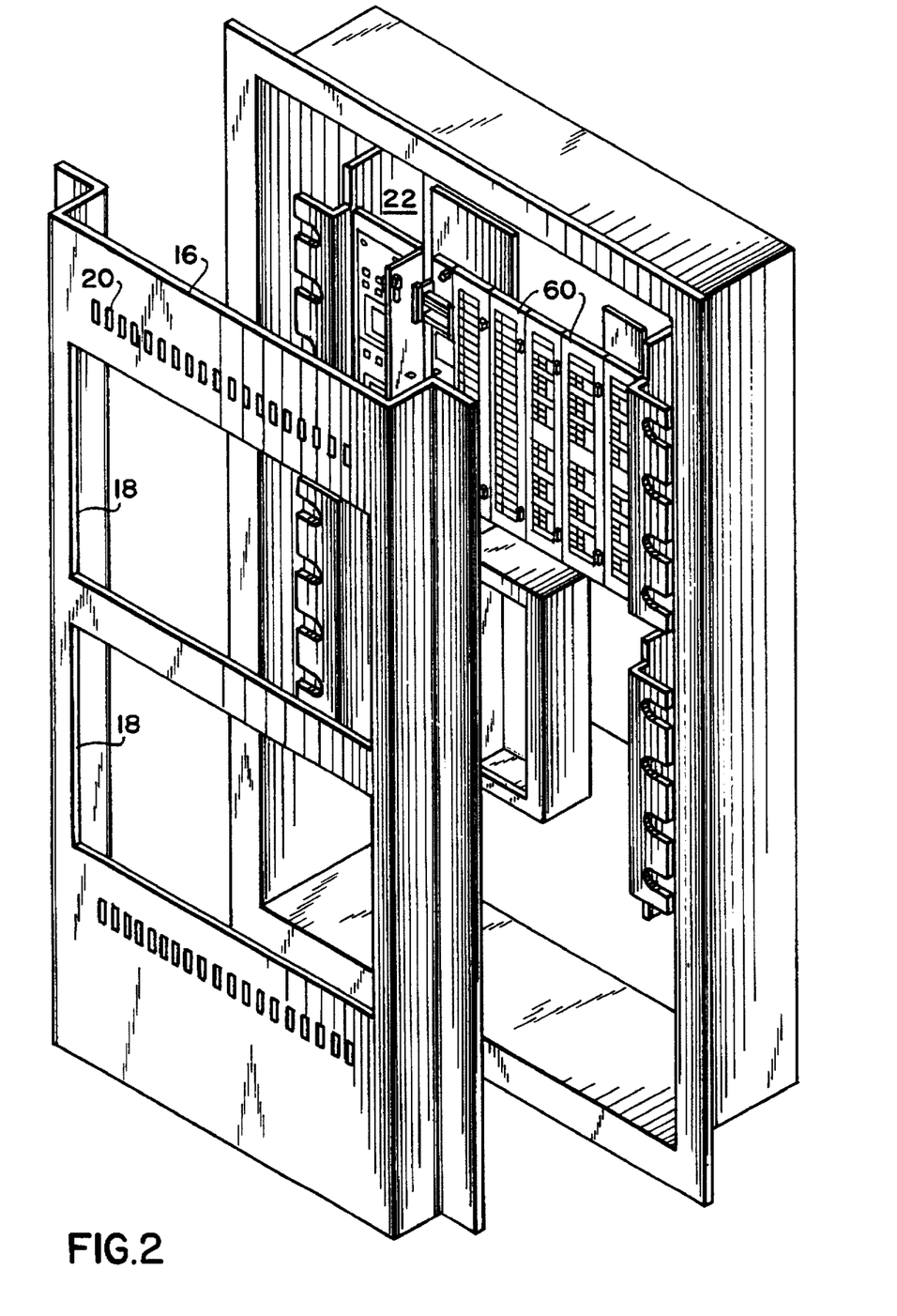
FIG. 2 is a perspective exploded view of a panel arrangement embodying the invention showing the door removed and the windowed face plate moved forward.
Figure 3:
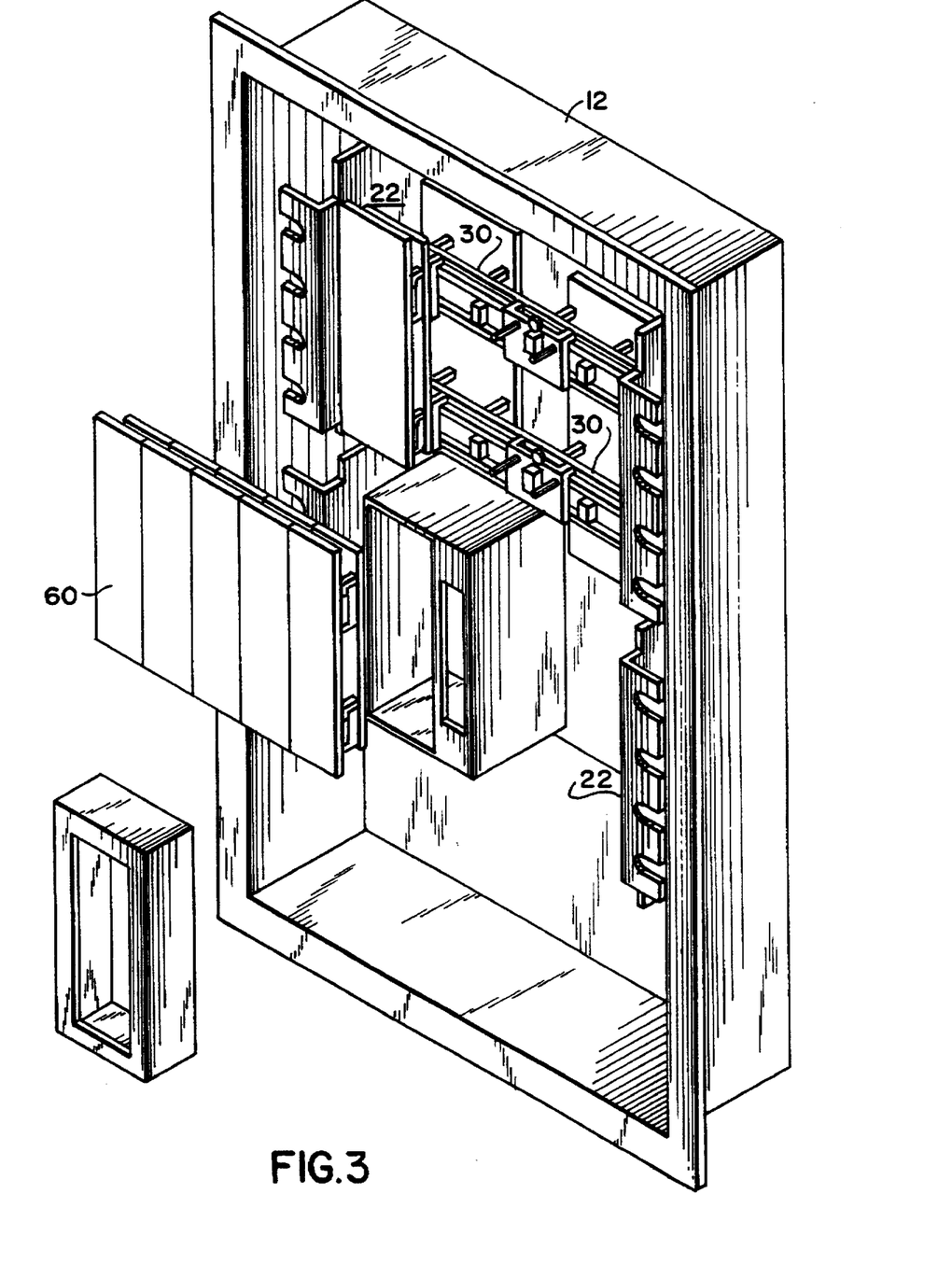
FIG. 3 is a further perspective exploded view of the panel arrangement showing the modules and parts moved forward to better illustrate the construction.

A panel arrangement sub-system of a multiple panel life safety system embodying the invention is generally designated 10 in FIG. 1. It comprises a rectangular housing 12 having a flange 14 about its opening for mounting and aesthetic purposes. Fitting in the opening is a cover plate 16 having access openings 18 and vent openings 20 as shown (FIG. 2).

Figure 4:
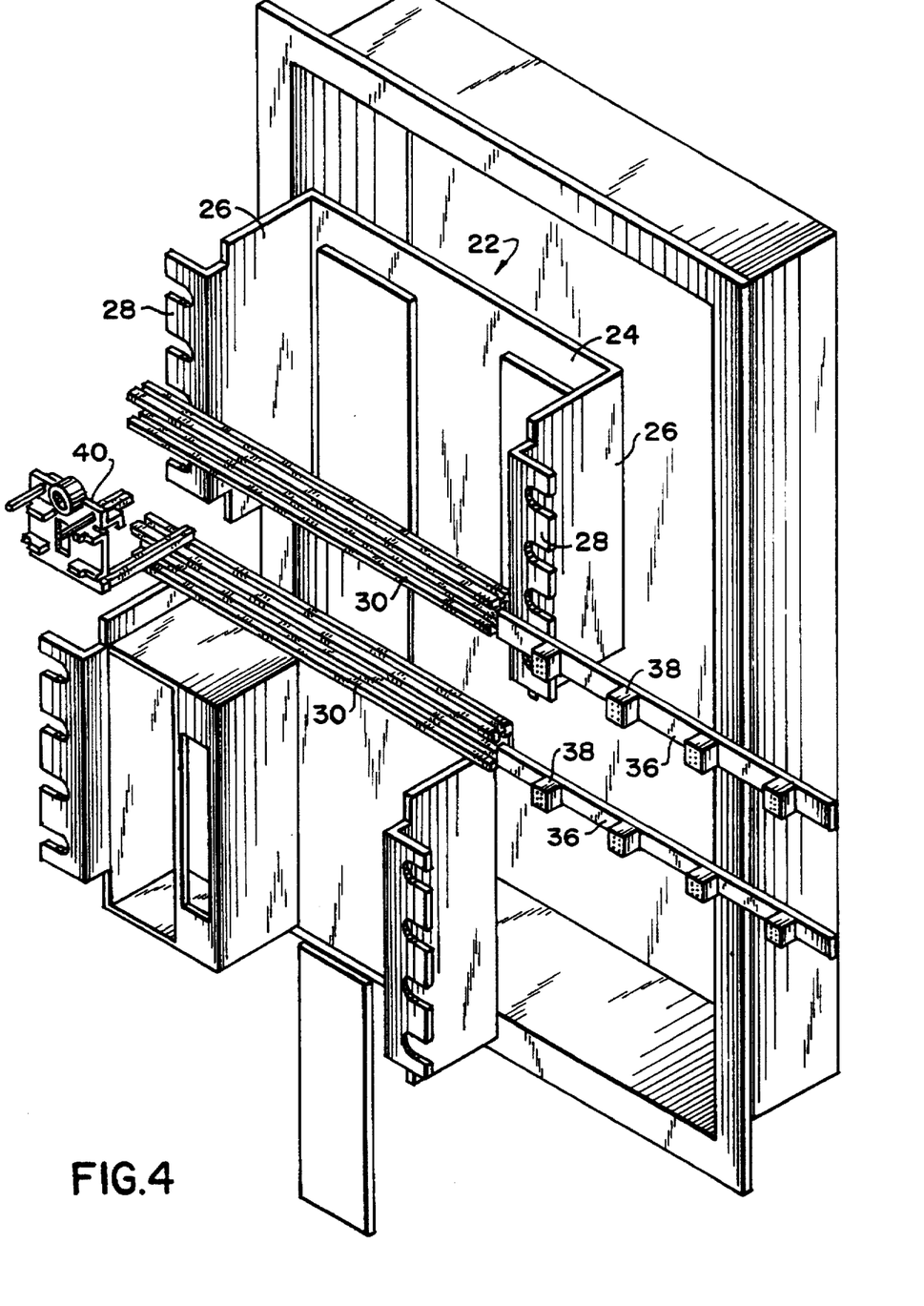
FIG. 4 is a further perspective exploded view with the chassis and support channels and rail printed circuit board exploded.
Figure 5:
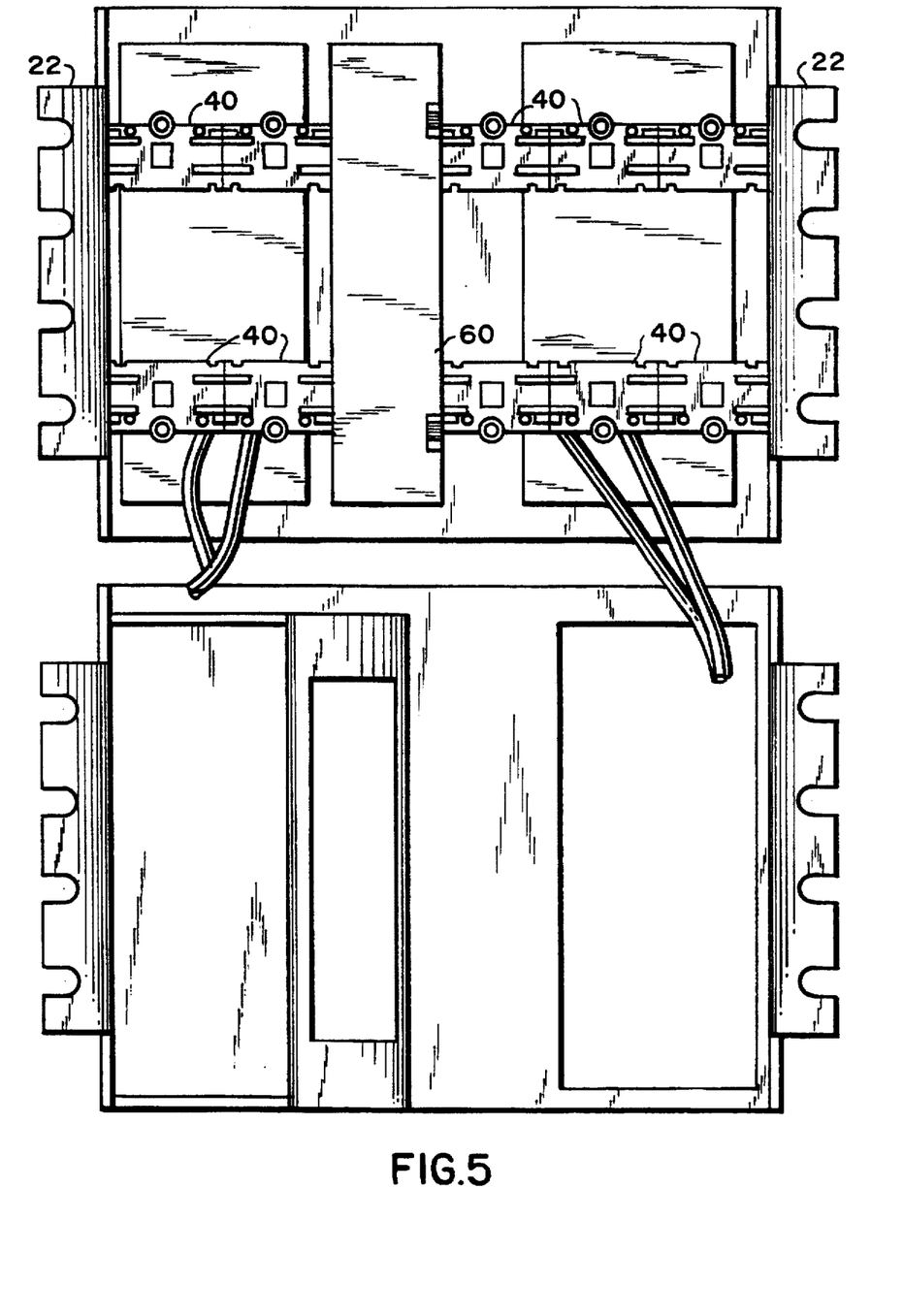
FIG. 5 is a front elevational view of the panel arrangement with all but one of the modules removed from the upper portion.

Secured in the housing are U-shaped chassis 22 (FIG. 4). These each comprise a rear wall or base plate 24 having forwardly impressed sections 26 and side plates 26 with outward flanges 28.

Figure 6:
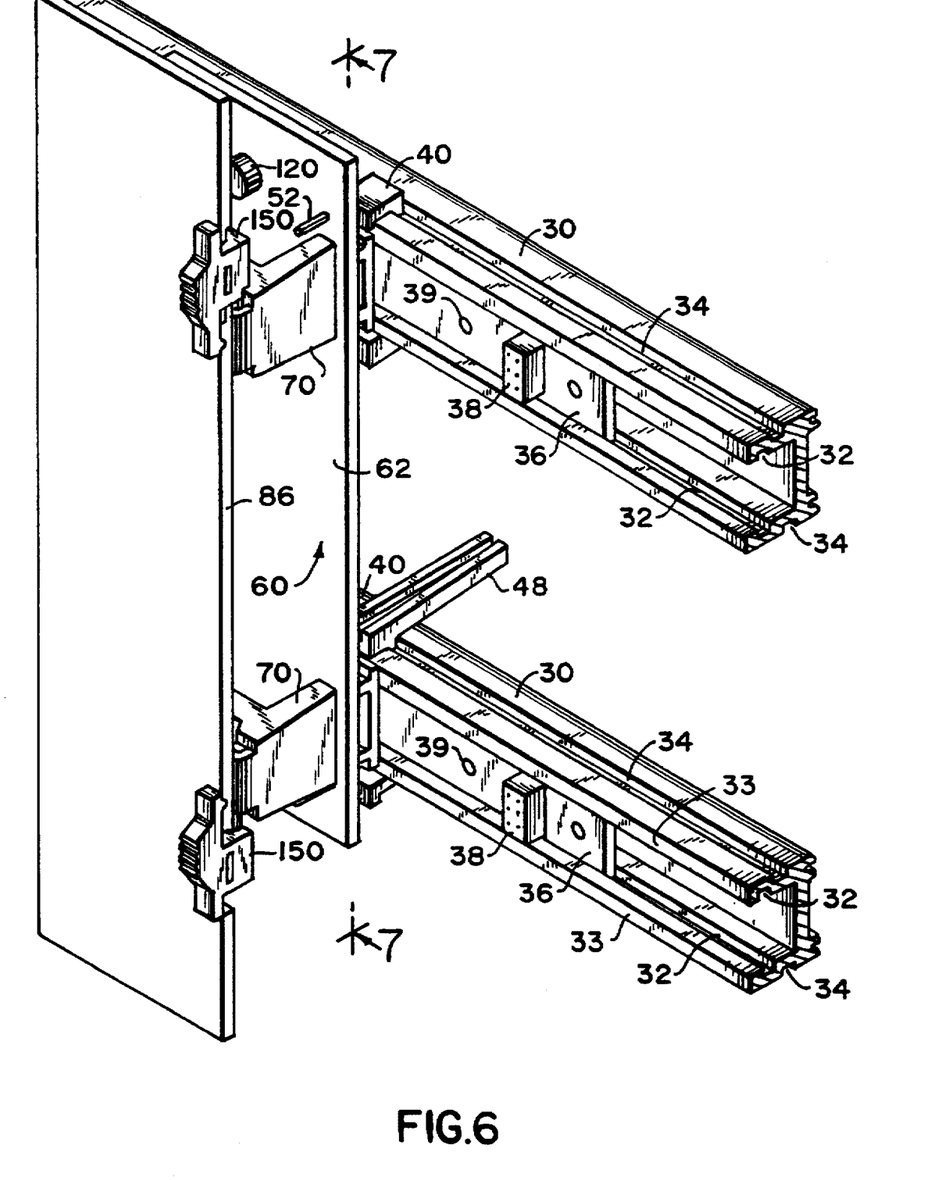
FIG. 6 is an enlarged perspective view of the support channels, the rail printed circuit board and a single module.

Mounting on and bridged between the side plates 26 are a pair of horizontal spaced parallel channel members 30 which are U-shaped, having their openings facing forward. The flanges 33, on both the outside and the inside thereof, are grooved as at 32 and 34 (FIG. 6). As shown, the grooves are staggered for purposes of reducing the thickness of the flanges:

Each channel member 30 slidably receives in its forward opening a rail printed circuit board 36 (FIG. 4). The circuitry on each board includes a "rail" as defined by a plurality of electric conductors serving for connecting power and providing communication to all of the modules. Various other circuitry is also provided within the modules, as described in one or more of the afore-mentioned patent applications. In addition, each rail circuit board 36 includes forwardly facing electrical connector boxes 38 at spaced intervals, each box enclosing an array of forwardly extending connector pins (not shown).

It will thus be understood that complete electrical connections for all stated purposes is uniquely achieved by the means just described, i.e., the horizontal two rail arrangement and the vertically disposed modules. It should also be understood that each of the rail circuit board 36 is securely supported as it rides in the grooves 32, it being, moveable only in lateral directions for adjustability as will appear.

Figure 7:
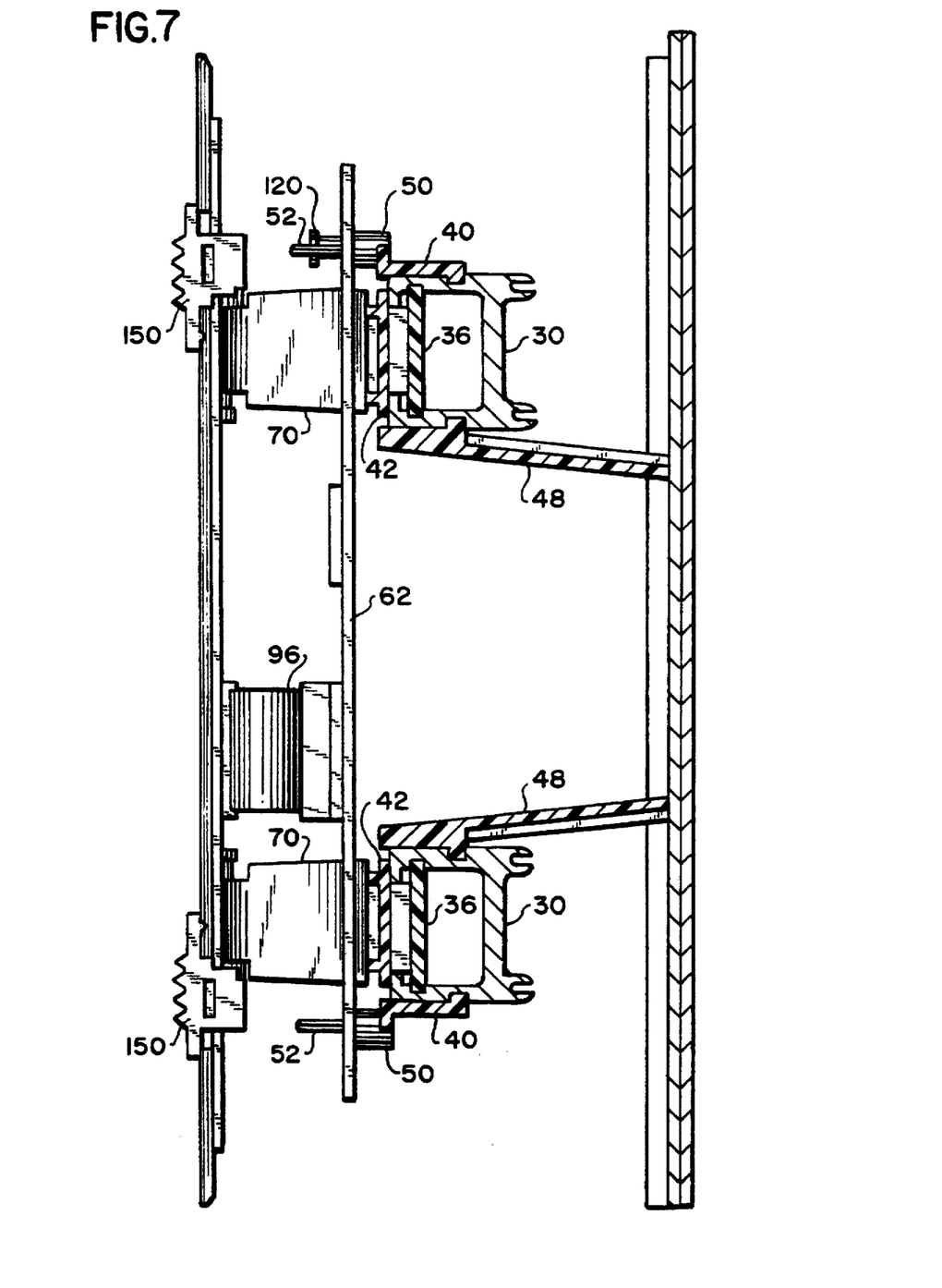
FIG. 7 is an enlarged sectional view taken on the line 7—7 of FIG. 6.
Figure 22:
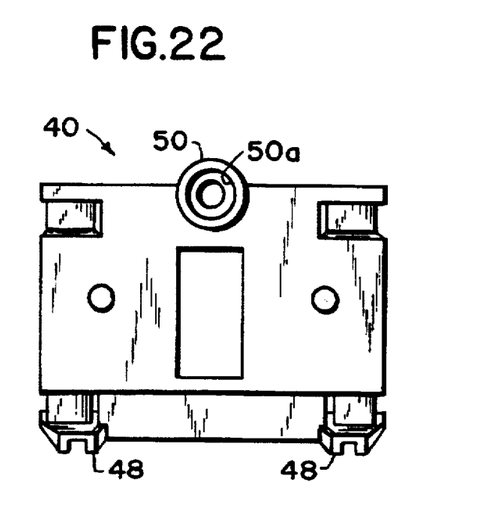
FIG. 22 is a rear elevational view of the retainer.

A plurality of module retainers 40 also ride on the channels (FIG. 7). As shown best in FIGS. 19 through 22, the retainers 40 are unitarily molded and each comprise a front plate 42, the rear of which rides against the forward edges of the channel flanges 33 (FIG. 7). The retainer is also provided with unitary rearward upward arms 44 and lower arms 46. Each of the arms has an inward finger 44a and 46a, respectively, which are received into the outward grooves 34 in the opposite flanges of the channels. The rearward arms 46 carry a support extension 48, the extensions extending rearwardly when the retainer is in place to abut against the rear face of the back wall of the panel box to support the channel. The upper edges of the retainers are each provided with a central tubular socket 50, the socket having a reduced mouth 50a as compared with its rearward interior to form a shoulder (FIG. 22) for purposes which will appear.

On either side of the socket there is a forward unitary locating pin 52. These pins which may be tapered fit into suitable openings in the printed circuit boards of the modules, to be explained. Central of the plate 42 is a rectangular aperture 54 which, in assembly, receives a connector box 38. Rearward pins 55 are formed on either side of the aperture to mate with openings 39 (FIG. 6) in a rail circuit board 36. Ribs 56, also unitary with the plate 42, are provided for strengthening the plate and extend forwardly to serve an addition as spacers supporting the module circuit board, to be explained. They are formed with cutouts 56a for reasons which will also appear.

The retainers 40 are assembled to the channel 30/rail circuit board 36, one retainer fitting over each connector box 38 as the rail circuit board 36 is slid into the channel 30. As this sliding assembly is effected, the fingers 44a train into the grooves 34 stabilizing the retainer against the front of the channel so that the retainer cannot come unattached from the channel. This assembly of the retainers and rail circuit board into the channel is effected before the channel is secured onto the chassis 22. Once the chassis is secured in the panel housing with the channels securely mounted therein, there is a sturdy support for the channels, the rail circuit board 36 and the retainers.

Figure 8:
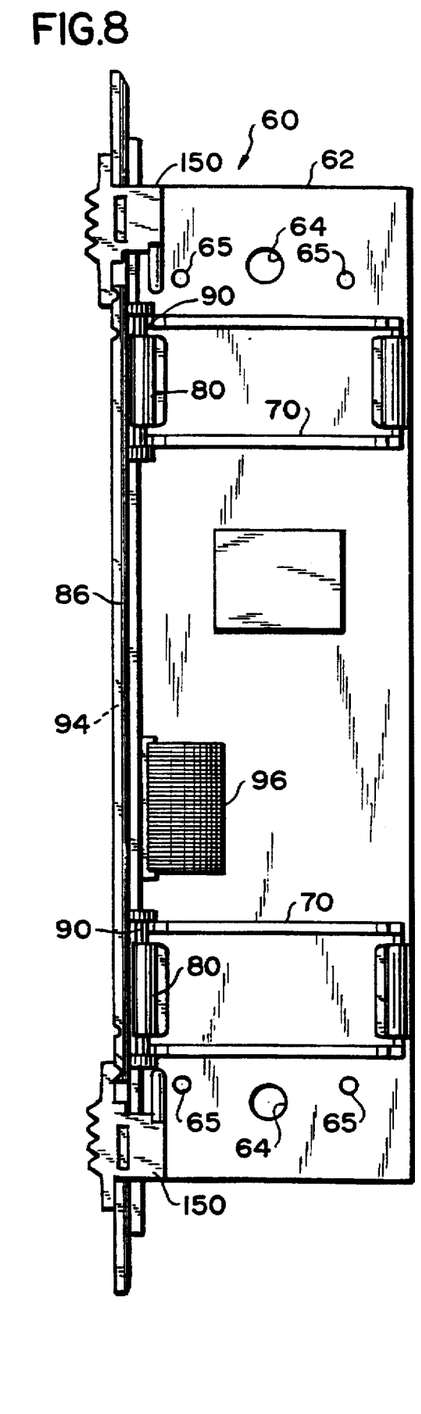
FIG. 8 is a front elevation view of a module with the door in open position.
Figure 9:
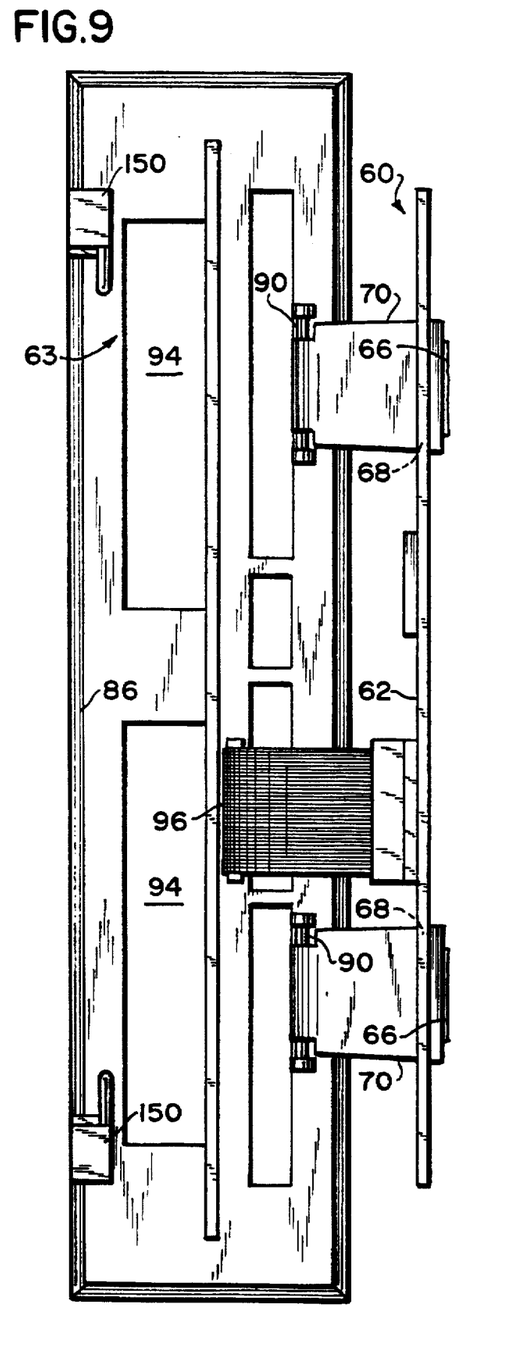
FIG. 9 is a side elevational view of FIG. 8.

With the retainers securely mounted on the channels inside the panel housing, there is a foundation of the mounting for the individual modules 60. As best shown in FIGS. 8 and 9, the modules 60 each comprise a module circuit board 62. Aside from its circuitry, the module circuit boards 62 are each formed with an upper and lower center line mounting hole 64 and inward therefrom connector boxes 66 extending rearwardly and fitting with the pair of the connector boxes 38 of the rail circuit boards 36.

Figure 23:
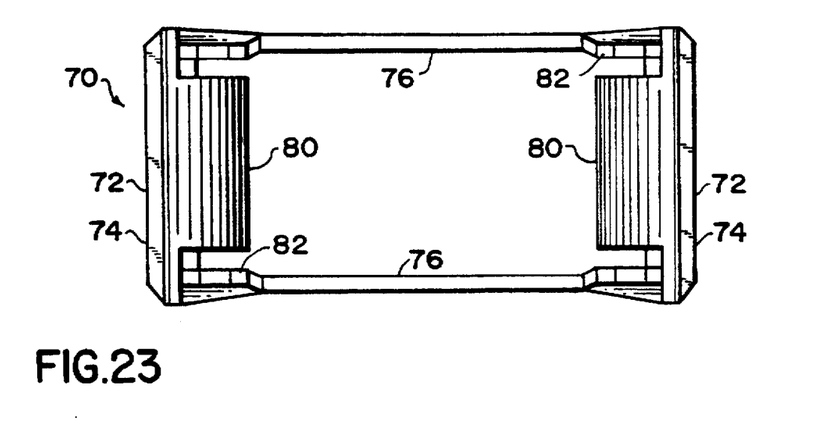
FIG. 23 is a front elevational view of the module bridging spacer.
Figure 24:
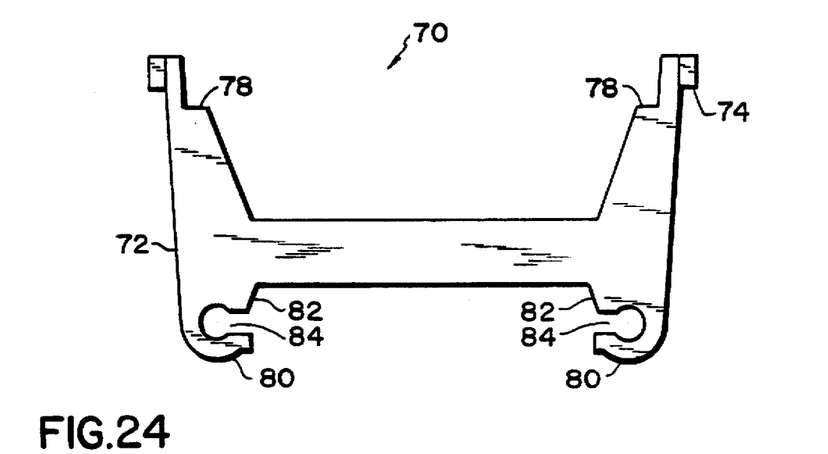
FIG. 24 is a top plan view of the spacer.
Figure 25:
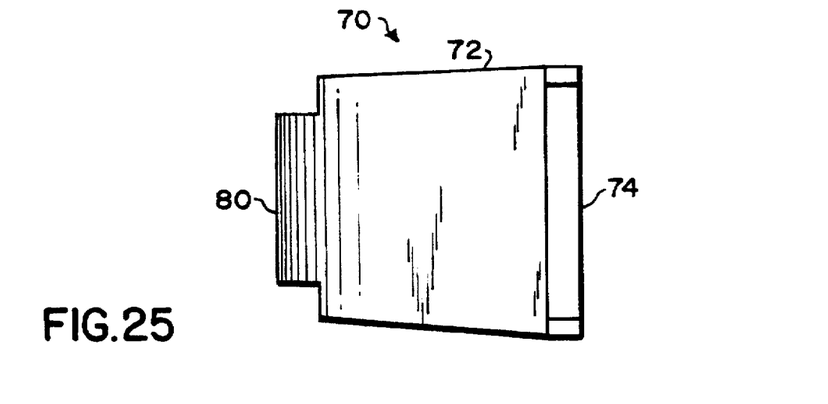
FIG. 25 is a fight side elevational view of the spacer.

The boards 62 are also slotted with vertical slots 68 on either side outboard of the connector boxes 66. Bridging over the boards are the door support spacer brackets 70. These each comprise FIGS. 23–25, box-like structures having end walls 72 diverging downwardly and having outward toes 74 at their lower ends. Top and bottom walls 76 are provided and have adjacent their lower ends shoulders 78 as shown. The upper ends of the end walls 72 have inwardly facing knuckles 80 which provide in cooperation with the detents 82 on the upper and lower wall pintle openings 84.

As shown in FIGS. 8 and 9, each module 60 includes two door support spacer brackets 70. These are secured to the module circuit board 62 by having their feet 74 squeezed toward each other, the feet being inserted through the vertical slots 68, respectively. When the feet are released, they spring outward and firmly attach the circuit board 62 between the feet and the shoulders 78, respectively, to securely hold it.

Figure 16:
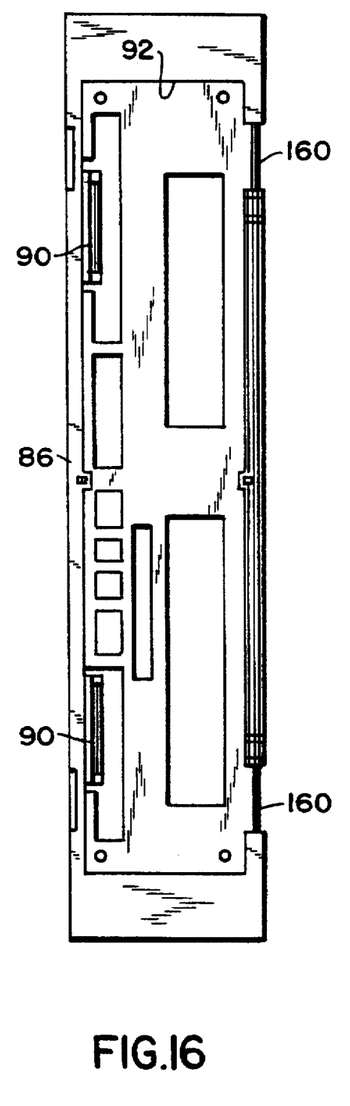
FIG. 16 is a front elevational view of a module door.
Figure 17:
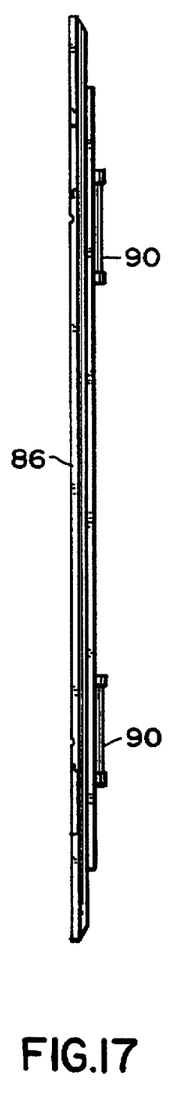
FIG. 17 is a fight side elevational view of the module door.
Figure 18:
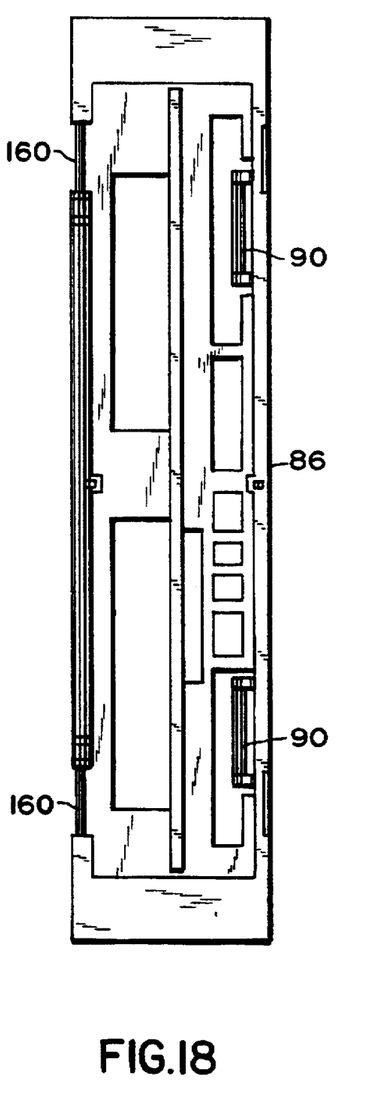
FIG. 18 is a rear elevational view of the module door.
Figure 19:
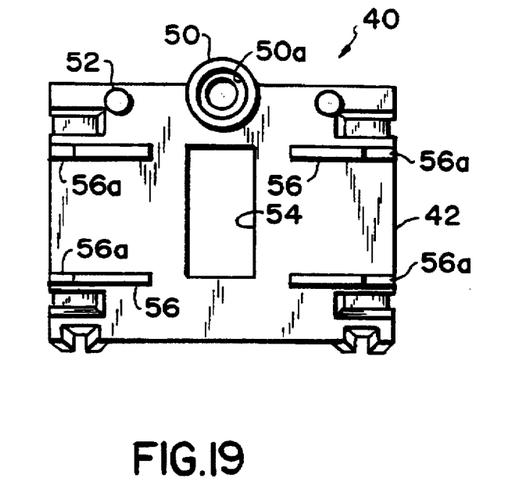
FIG. 19 is a front elevational view of a module retainer.
Figure 20:
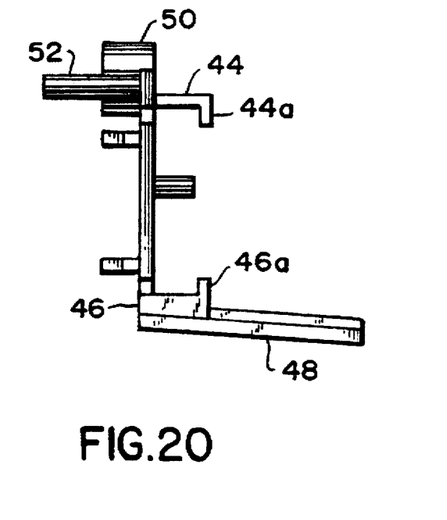
FIG. 20 is a side elevational view of the retainer.
Figure 21:
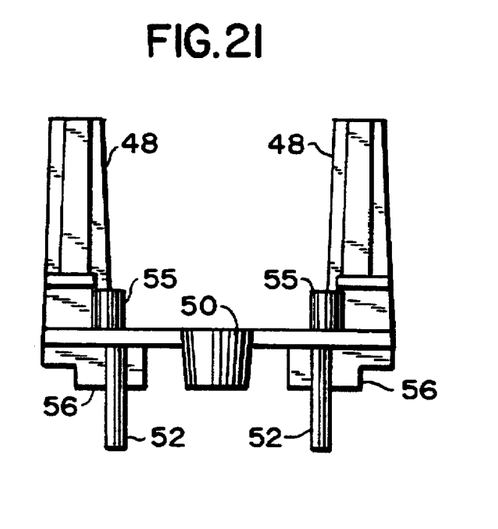
FIG. 21 is a top plan view of the retainer.

Another particular module 63, serving for display and switch purposes and already noted, are contained within door 86. Each door panel has formed on its rearward face a flat U-shaped pintle 90 spaced inward from the hinge edge. These pintles are unitarily molded with the door and fit, respectively, into the knuckles 80 of the spacer brackets 70 for effecting a hinging of the door 86 on the module circuit boards 62. As shown in FIGS. 16 through 18, the front of each door has a large central recess 92 and receives a circuit board 94 (FIG. 8). The forward face of the circuit board 94 may comprise a plurality of touch buttons which, in assembly, are covered by a facing sheet, the buttons being pressable through the facing sheet. The sheets may bear appropriate indicia (FIG. 1). The door panel circuit board 94 and the module circuit board 62 may carry separate connector blocks to electrically connect them through a ribbon connector 96 (FIG. 7) as well-known in the art. These ribbon connectors may not only connect boards in the same module positions but may connect connectors in adjacent or remote modules, all having the description noted above.

In assembly, the modules 60 (six identical ones are shown in FIG. 1) are attached to the rail circuit board 36 by having their connector boxes 66 engage into or over, as the case may be, connector boxes 38 in the rail boards. As this assembly step is undertaken, the pins 52 on the retainers 40 serve as locating pins as they are inserted into the guide holes 65 on the module circuit board 62. The frictional engagement of the pins 52 and the boxes 66 and 38 are sufficient at least temporarily to support the core module in place.

Figure 26:
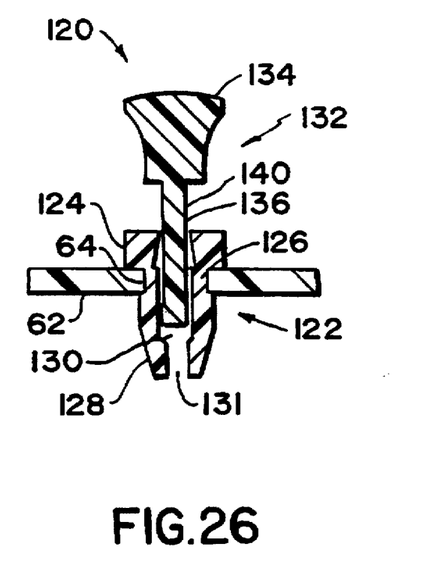
FIG. 26 is an enlarged sectional view of a securing stud before enlargement.
Figure 27:
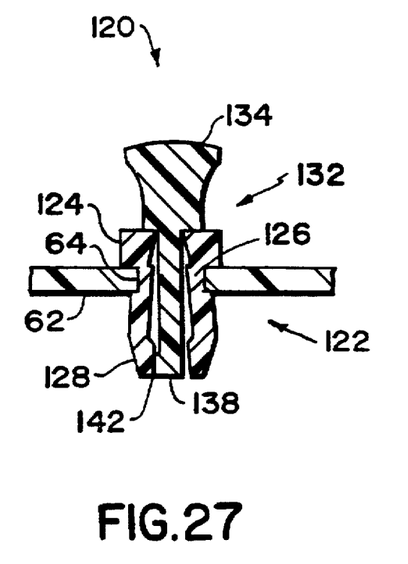
FIG. 27 is an enlarged view of the securing stud after enlargement.
Figure 28:
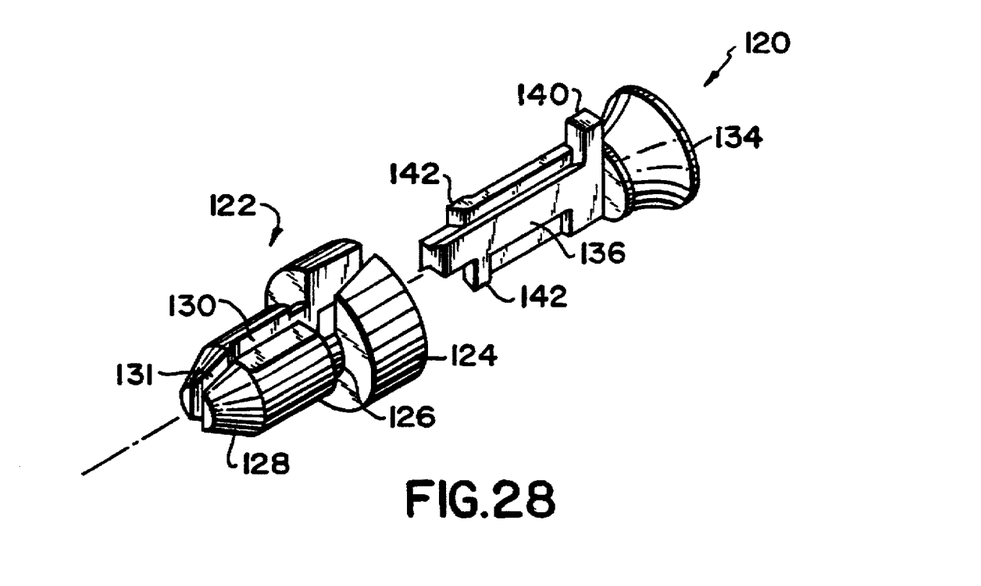
FIG. 28 is a perspective view of the securing stud of FIG. 26.

Referring to FIGS. 26, 27 and 28, additional securement of the module on the channels is in the form of securing stud 120. Each of these studs are two-part assemblies including a plastic grommet-shaped base 122 having a forward peripheral flange 124 and a reduced neck 126 rearward therefrom received into each hole 64 (FIG. 8) in the rear panel 62. The rear end of the base 122 is tapered at 128 for lead-in purposes. The base is radially slotted at 130, the walls of the slot toward the lead-in end converging as at 131.

The stud 120 also comprises an expansion element 132 which may have an enlarged forward knob 134 from which extends a rearward stem 136, the stem having a pointed rear end 138. The stem 136 is formed with a lateral finger 140 adjacent the knob, the pin adapted to slide into the slot 130 in the base member. Finally, the distal rearward end of the element 132 is formed with a hook 142 adapted when the element is inserted all the way in the base 122 to hook over the tapered surface 128 holding the element 132 releasably in an inward position in the base.

In assembly, the reduced neck of the base fits snugly in each of the securing holes 64, respectively. In further assembly the tapered end of the base is inserted into the socket 50 in the adjacent retainer 40. Once the base is all the way in the socket, the knob 134 of the securing element 132 may be pressed all the way in. As the distal end of the stem engages the converging surfaces 131, there is a forced enlargement of the rearward end of the base 122. This enlargement makes the rearward end of the base larger in diameter than the reduced opening 50a of the socket 50 and effects a securing of the module onto the retainer. (It will be recalled that the retainer is secured to the channels, respectively, by the fingers 44a and 46a which are received into the outward grooves 34 of the channels. Thus, the module 60 is mounted firmly into the panel housing.)

Figure 13:
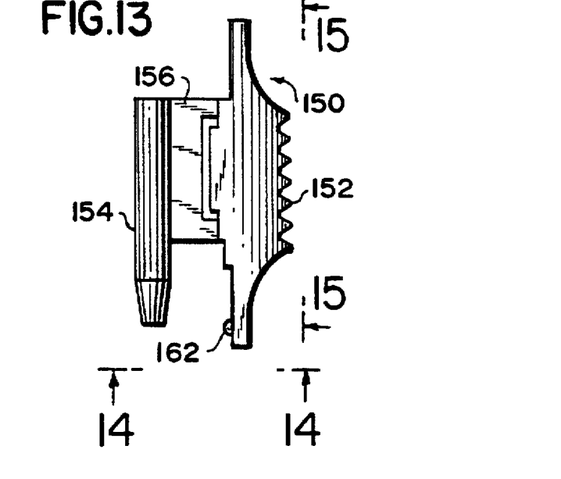
FIG. 13 is an enlarged side elevational view of a sliding lock element as used on the module doors.
Figure 14:
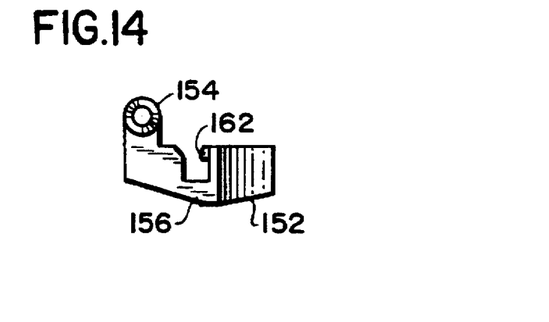
FIG. 14 is a bottom plan view of the element.
Figure 15:
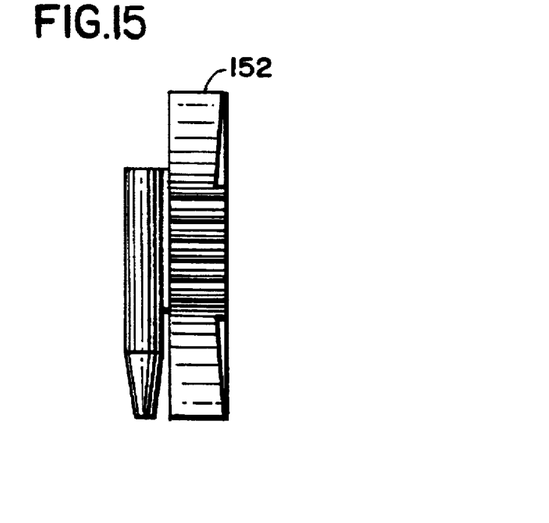
FIG. 15 is a front elevational view of the element.

Another aspect of the invention is the means for holding shut the door housing the module. Referring to FIGS. 12 through 15, each door is fitted with a pair of sliding latches. A sliding latch, per se, is shown in greatly enlarged views (FIGS. 13 through 15). These latches 150 are unitarily molded single pieces and comprise a finger piece 152 and a latching element 154 jointed by a bight 156. As shown in FIG. 14, the bight is formed with a U-shaped opening having an entry lip 158. The module door is formed on its distal edge away from each hinge pintle with a thickened rib 160.

Thus, in assembly, the opening in the latch piece may be spread as the thin resilient bight 156 flexes, causing the lip to snap over the rib 160, releasably attaching the slide latch to the edge of the door. As shown, a detent 162 may be formed in one of the wings of the finger piece 152 the detent adapted to snap into grooves 164, respectively, on the front of the door panel 86 to releasably hold the latch in latched or unlatched condition. In the latched condition, the latching element 154 of the slide latch penetrates into the opening 80 of the bracket opposite the opening occupied by the door pintle. This latches the door in closed position, and the two separate slide latches effectively hold the door panel of a single module in shut condition.

Figure 10:
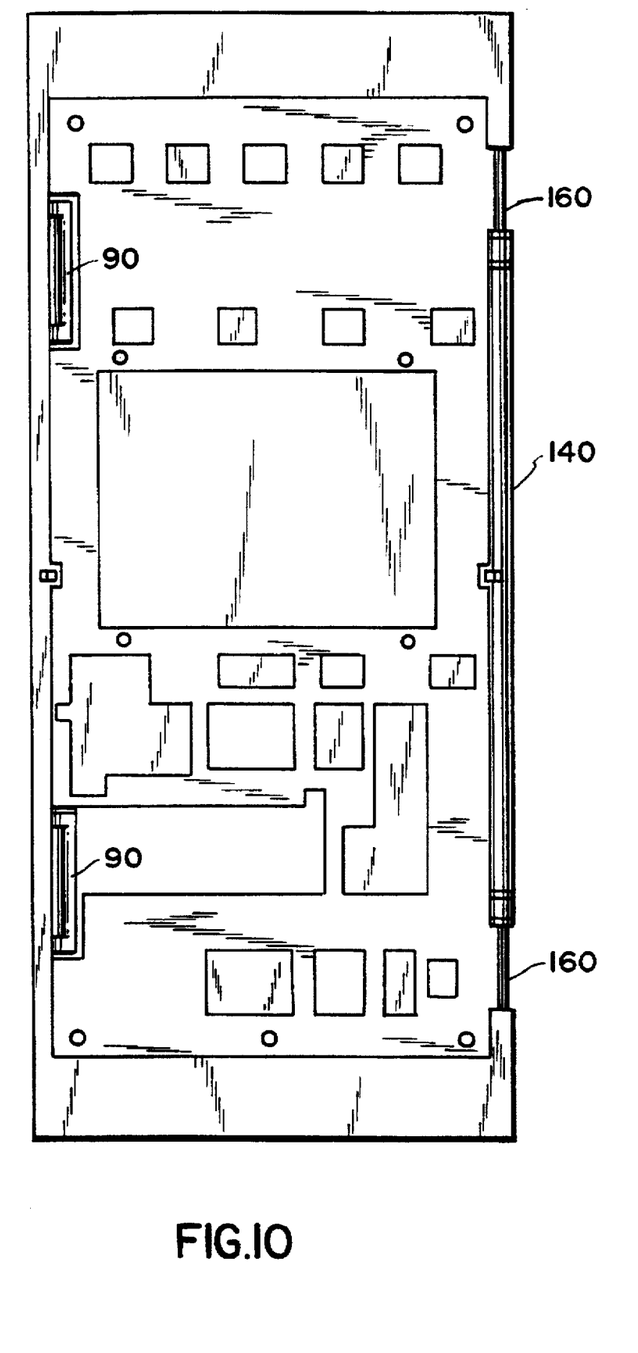
FIG. 10 is a rear elevational view of the door for the larger leftward control panel showing the hinge pintles.
Figure 11:
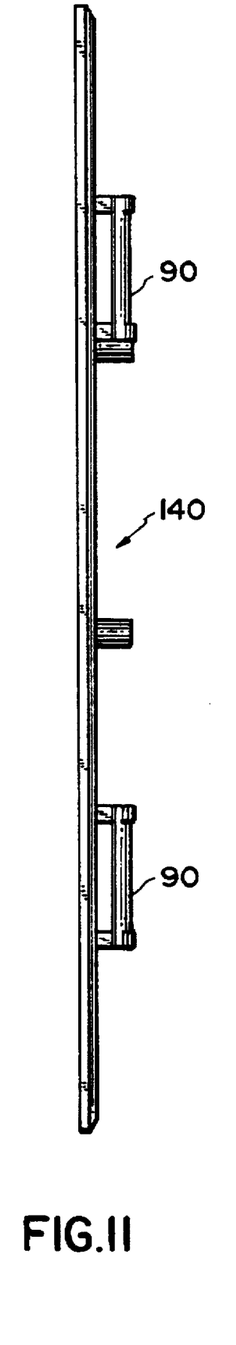
FIG. 11 is a left side elevation of FIG. 10.
Figure 12:
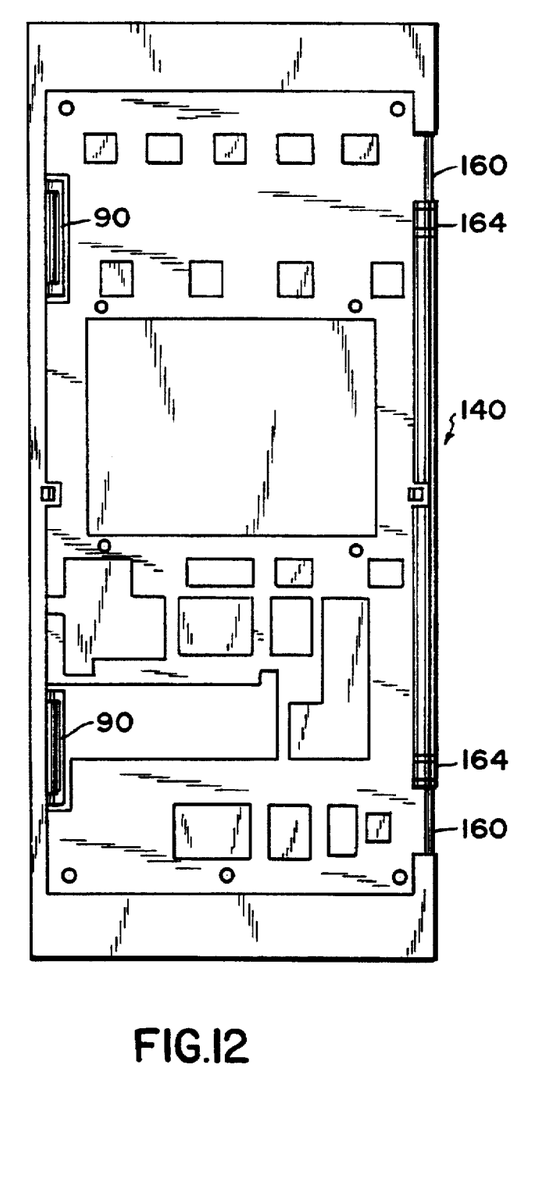
FIG. 12 is a reduced version of FIG. 10.

Reference to FIG. 1 shows that a plurality of modules may be aligned side-by-side in the panel. These modules are all accessible through the flush plate 18 for various purposes. Also present may be the different sized modules as the left ward one having a door panel 140 is shown in FIG. 10, etc. Such differently shaped doors may be part of a module mounted similarly on the channels and having similar latching means, the panel may also comprise recesses for telephone hand sets, etc. as is well-known in the art.

The present invention provides simple modules having circuit boards integrated into both the base and door panels. The invention also provides a compact support system whereby the panels may be firmly supported without the use of tools of any kind whereby the support system integrates electrical connections between the modules and the underlying rail.

While the invention is shown in a limited number of forms and embodiments, it is limited only by the following claim language which may be extended by an enlargement of the fight to exclude as is appropriate under the doctrine of equivalents.

We claim:

1. A panel sub-system for a life safety system comprising:
   a plurality of inter-connected panels, each panel including a local rail;
   a plurality of circuit modules, each comprising a module circuit board, interconnected by said local rail; a first of the modules being a central processing unit, and the remainder being I/O modules having a variety of functions;
   at least two channel members containing respective rail circuit boards defining each said local rail, each rail circuit board having spaced electrical connectors for connecting to said respective module circuit boards.

2. A panel sub-system as defined in claim 1, in which said channel members are horizontally disposed, and said module circuit boards are vertically disposed; retainer means affixed to said channel members at each of said electrical connector locations, said retainer means including means for physically positioning and securing said module circuit boards to said channel members.

3. A panel sub-system as defined in claim 2, further comprising doors supported on respective module circuit boards, and separate circuit boards contained within the respective doors and connected to said respective module circuit boards.

4. A panel sub-system as defined in claim 3, further including a pair of door support spacer brackets fitted into spaced openings in respective module circuit boards for spacing of said doors from said circuit boards and for hinge means on said doors.

5. A panel sub-system as defined in claim 4, in which said spacer brackets are parallel and aligned with each other, each bracket having side legs, the outer ends of which are secured to the module circuit board, the bight of the U-shaped brackets bridging over and spaced from the base board, the ends of the legs adjacent the bight having openings facing the other bracket; and in which said hinge means have adjacent one edge thereof a pair of spaced aligned hinge pintles hingedly received into aligned openings in the respective spacer brackets, and having adjacent the opposite edge a pair of spaced slidable locking pins adapted to slide from a non-engaged position clear of the door support spacer brackets to an engaged position in which they are received into the respective openings in the brackets not receiving the pintles.

6. A panel sub-system as defined in claim 5, wherein the openings at the end of each leg comprise a hook-shaped element facing the hook-shaped element on the other leg of the same door mounting bracket and the opening is defined by the inside of the hook.

7. A panel sub-system as defined in claim 6, wherein the door brackets are each a box-like structure comprising a pair of spaced end walls defining the legs and having the hook shaped elements at the upper end thereof, and spaced side panels of generally U-shape.

8. A panel sub-system as defined in claim 5, wherein the slidable locking pins each comprise a unitary slider having a retaining slot along one side adapted to receive and engage said opposite edge of the door for movement therealong and the upper side of the slider is serrated for gripping and the lower side of the slider is formed with the locking pin.

9. A panel sub-system as defined in claim 8, wherein the opening of the retaining slot is formed with an inward rib therealong adjacent the entrance thereof and the said opposite edge is formed with retaining lip along said opposite edge, the lip receiving the rib to retain the slider on the door panel.

10. A panel sub-system as defined in claim 5, wherein the door support brackets are secured to the module circuit boards by slots formed in the boards adjacent the respective opposite edges thereof, the slots receive respectively projections at the lower end of the legs.

11. A panel sub-system as defined in claim 10, wherein the slots are spaced laterally more closely than the projections so that to fill in the slots, the legs must be compressed together.

12. A panel sub-system comprising:

a pair of parallel outwardly facing support channels adapted to be supported in the housing between side walls thereof, the flanges of each channel having inward and outward grooves, the inward grooves confronting each other;

a rail circuit board received within the flanges of each support channel, opposite edges of the boards respectively slidably received into the inward grooves in the flanges so that the rail circuit boards are trapped respectively in the channels, the rail circuit boards having forwardly facing spaced aligned electrical connector blocks;

a pair of module retainers, each retainer comprising an apertured stabilizing plate resting against the flanges of the channel and the apertures of the respective plates receiving the said connector blocks, the plates having unitary rearward arms on each side of the channel, the channels having inward fingers disposed in the outward grooves in the channel, legs adapted to engage the back panel of the central processing unit box, the plates each being formed with a forward locating pin; and a module circuit board having a locating hole receiving the pin and means for securing it to the retainer.

13. A panel sub-system as defined in claim 12, wherein the module comprises:

a module circuit board;

a pair of identical spaced U-shaped door mounting brackets, the brackets being parallel and aligned with each other, each bracket having side legs, the outer ends of which are secured to the circuit board, the bight of the U-shaped brackets bridging over and spaced from the base board, the ends of the legs adjacent the bight having openings facing the other bracket; and a door, having a circuit board, superposing the module circuit board and having adjacent one edge a pair of spaced aligned hinge pintles hingedly received into aligned openings in the respective brackets, and having adjacent the opposite edge a pair of spaced slidable locking pins adapted to slide from a non-engaged position clear of the door brackets to an engaged position in which they are received into the respective openings in the brackets not receiving the pintles.

14. A panel sub-system as defined in claim 12, wherein the module retainers are each formed with a socket opening and the base printed circuit board is formed with an opening and each opening recedes a stud, the socket comprising the means for securing, each stud assembly comprising:

a generally cylindrical base formed with a flange about one end and a lead-in chamfer about the other end and a longitudinal slot inward from the periphery thereof, the slot having adjacent the said other end a pair of converging walls; and an expansion element extending into the slot in the stud and having a lead-in end adapted when the element is pressed into the stud to engage and spread the converging walls, the stud assembly being disposed in the mounting hole in the base circuit board with the flanges thereon engaging the rear circuit board, the lead-in end being disposed in the socket in the retainer; whereby when the expansion element is pressed into the base and engages the converging walls to increase the diameter of the lead-in end of the stud and lock the module against the retainer.

15. A panel sub-system as defined in claim 14, wherein the base and expansion element are formed with interfitting detent means to releasably hold the expansion element and base in locked position.

16. A panel sub-system as defined in claim 15, wherein the base is formed adjacent the flange with a circumferential groove adapted to releasably hold the stud in its mounting hole in the base printed circuit board.

17. A panel sub-system as defined in claim 12, having a latchable door assembly comprising:

a door having along one edge an outward retaining lip; and a slidable latch comprising a unitary molded slider having a retaining slot along one side adapted to receive and engage said edge of the door panel for movement therealong and the upper side of thee slider is serrated for gripping and the lower side of the slider is formed with a locking pin directed to the edge of the door, the opening of the retaining slot being formed with an inward rib therealong adjacent the entrance thereof, the lip yieldably receiving the rib to retain the slider on the door panel.

18. A latchable door assembly as claimed in claim 17, wherein the slider and door panel are formed with cooperant detent means to hold the slider in locked position.

* * * * *